United States Patent
Sheehan et al.

(10) Patent No.: US 9,512,027 B2
(45) Date of Patent: Dec. 6, 2016

(54) MOLD ASSEMBLY WITH CONCENTRIC TUBES FOR LEAKPROOF SUPPLY OF FLUID AND VACUUM

(71) Applicant: CORNING INCORPORATED, Corning, NY (US)

(72) Inventors: Brian Christopher Sheehan, Elmira Heights, NY (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/576,976

(22) Filed: Dec. 19, 2014

(65) Prior Publication Data

US 2015/0175468 A1    Jun. 25, 2015

Related U.S. Application Data

(60) Provisional application No. 61/919,029, filed on Dec. 20, 2013.

(51) Int. Cl.

| C03B 23/023 | (2006.01) |
|---|---|
| C03B 23/035 | (2006.01) |
| C03B 23/025 | (2006.01) |
| F16L 9/18 | (2006.01) |
| F16L 39/00 | (2006.01) |

(52) U.S. Cl.
CPC ....... *C03B 23/0235* (2013.01); *C03B 23/0258* (2013.01); *C03B 23/0357* (2013.01); *F16L 9/18* (2013.01); *F16L 39/005* (2013.01)

(58) Field of Classification Search
CPC .................. C03B 23/0235–23/0357
See application file for complete search history.

(56) References Cited

U.S. PATENT DOCUMENTS

| 2010/0276026 A1* | 11/2010 | Powell | F16L 39/005 138/114 |
|---|---|---|---|
| 2011/0290361 A1* | 12/2011 | Anderson | F16L 27/087 138/114 |
| 2012/0297828 A1 | 11/2012 | Bailey et al. | 65/29.18 |

FOREIGN PATENT DOCUMENTS

| DE | 3735718 A1 | 4/1988 |
|---|---|---|
| DE | 20117431 U1 | 4/2003 |

OTHER PUBLICATIONS

Patent Cooperation Treaty International Notification of Transmittal of the International Search Report and the Written Opinion of the International Searching Authority, international application No. PCT/US2014/070436: mailing date Apr. 16, 2015, 11 pages.

* cited by examiner

*Primary Examiner* — Erin Snelting
(74) *Attorney, Agent, or Firm* — John T. Haran

(57) ABSTRACT

A mold assembly includes a mold having a mold cavity defined by a mold surface having a three-dimensional shape and at least one opening for communication of fluid or vacuum to the mold cavity. A plenum base is mounted to the mold such that a chamber is defined between the plenum base and the mold, where the chamber is in communication with the at least one opening in the mold. A cooling plate is arranged in the chamber. A fluid passage is defined between the concentrically arranged outer tube and inner tube coupled to the plenum base. One fluid conduit extends through the inner tube and a first opening in the plenum base to the chamber. Another fluid conduit extends from the fluid passage through a side port in the outer tube and a second opening in the plenum base to the cooling plate.

19 Claims, 4 Drawing Sheets

MOLD ASSEMBLY WITH CONCENTRIC TUBES FOR LEAKPROOF SUPPLY OF FLUID AND VACUUM

This application claims the benefit of priority to U.S. Application No. 61/919,029 filed Dec. 20, 2013, the content of which is incorporated herein by reference in its entirety.

FIELD

The field relates to thermal reforming of a two-dimensional (2D) glass sheet into a three-dimensional (3D) glass article using a mold. The field further relates to supply of process fluids and vacuum in a thermal reforming process.

BACKGROUND

U.S. Patent Application Publication No. 2012/0297828, Bailey et al., discloses a glass molding system that can be used to form 3D glass articles from 2D glass sheets in a continuous fashion. In a typical process, a 2D glass sheet is placed on a 3D mold surface and then heated to a forming temperature at one or more stations of the glass molding system. By supplying vacuum to the mold cavity through openings in the mold, the hot 2D glass sheet is conformed to the 3D mold surface to form a 3D glass article. After the conforming, the vacuum is released from the mold cavity. Process fluid is then supplied through the same mold openings to rapidly cool the 3D glass article to a temperature below the strain point of the glass. To control the mold temperature during this cooling phase, a separate line is used to supply process fluid to a cooling plate, which then operates to remove heat from the mold.

Fine adjustments to the supplied vacuum and process fluids are needed to control the accuracy of the glass shapes formed by the system. To achieve such fine adjustments, it is important to supply the vacuum and process fluids without leakage since leakage can cause process variability from one position to another in the system, which can lead to part-to-part shape variation.

The molds used in a glass molding system such as described above typically require coatings that do not react with glass at high temperatures. Since these coatings typically have a short life, it is beneficial to be able to quickly and automatically change out a mold that needs to be resurfaced.

SUMMARY

In one aspect, the disclosed herein is a mold assembly for use with a glass molding system. In one illustrative embodiment, the mold assembly comprises a mold having a mold cavity defined by a mold surface having a 3D shape and at least one opening for communication of process fluid or vacuum to the mold cavity. The mold assembly further includes a plenum base that is mounted to the mold such that a chamber is defined between the plenum base and the mold, where the chamber is in communication with the at least one opening in the mold. A cooling plate is arranged in the chamber. Each of an outer tube and an inner tube has a first end proximate the plenum base and a second end remote from the plenum base. The outer tube and inner tube are concentrically arranged such that a fluid passage is defined between them. A first fluid conduit extends through the inner tube and a first opening in the plenum base to the chamber. A second fluid conduit extends from the fluid passage through a port in the outer tube and a second opening in the plenum base to the cooling plate.

In one illustrative embodiment, an interface between the first fluid conduit and the plenum base comprises a metal-sealed joint.

In one illustrative embodiment, an interface between the second fluid conduit and each of the outer tube, plenum base, and cooling plate comprises a metal-sealed joint.

In one illustrative embodiment, the mold assembly further comprises a receiver having a bore, a first port for communication of process fluid with the bore, and a second port for communication of process fluid with the bore, where the second ends of the outer tube and inner tube are received in the bore.

It is to be understood that both the foregoing general description and the following detailed description are exemplary of the disclosure and are intended to provide an overview or framework for understanding the nature and character of the disclosure as it is claimed. The accompanying drawings are included to provide a further understanding of the disclosure and are incorporated in and constitute a part of this specification. The drawings illustrate various embodiments of the disclosure and together with the description serve to explain the principles and operation of the disclosure.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
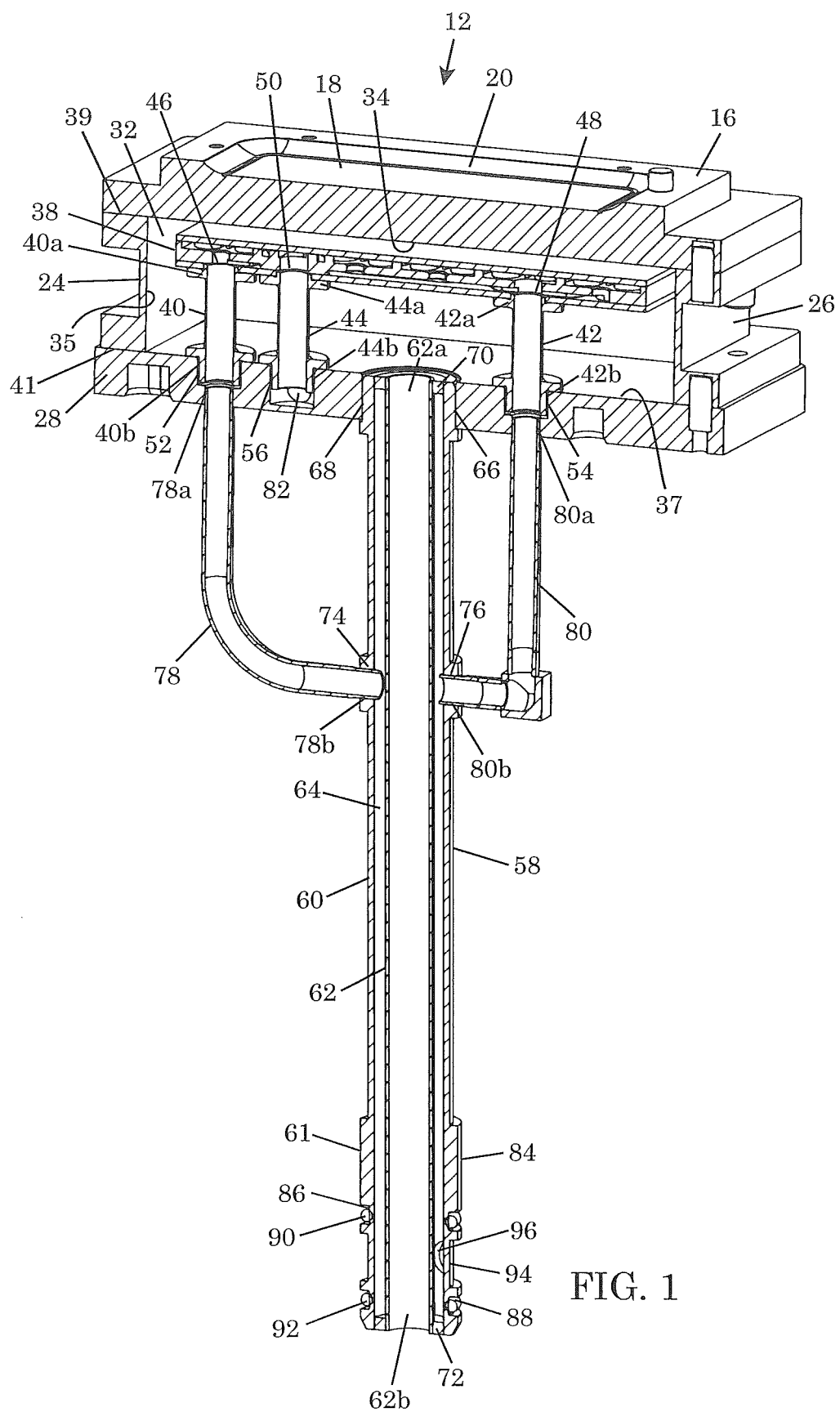
FIG. 1 shows a mold assembly without a receiver.

In the following detailed description, numerous specific details may be set forth in order to provide a thorough understanding of embodiments of the disclosure. However, it will be clear to one skilled in the art when embodiments of the disclosure may be practiced without some or all of these specific details. In other instances, well-known features or processes may not be described in detail so as not to unnecessarily obscure the disclosure. In addition, like or identical reference numerals may be used to identify common or similar elements.

Figure 2:
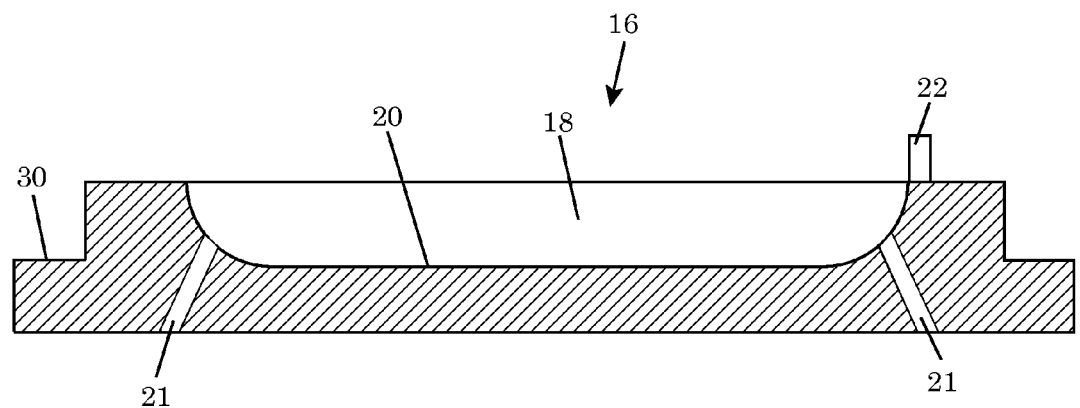
FIG. 2 shows a mold with openings for communication of process fluid or vacuum to a mold cavity.

FIG. 1 discloses a mold assembly 12 for use in a glass molding system such as described in the Bailey et al. publication. The mold assembly 12 includes a mold 16 having a mold cavity 18 defined by a 3D mold surface 20, where the shape of the 3D mold surface 20 depends on the shape of the 3D glass article to be formed by the mold 16. As shown in FIG. 2, the mold 16 has openings 21 for communication of fluid, typically gas, or vacuum to the mold cavity 18. The mold 16 may include one or more pins 22 on its upper surface to assist in aligning a 2D glass sheet with the mold cavity 18.

Returning to FIG. 1, a plenum base 24 is attached to the bottom of the mold 16. The plenum base 24 includes a casing 26 and a base plate 28. The top end of the casing 26 is attached to the mold 16, and the bottom end of the casing 26 is attached to the base plate 28. The bottom surface 34 of the mold 16, the inner surface 35 of the casing 26, and the top surface 37 of the base plate 28 define a chamber 32. In one embodiment, to achieve a leakproof chamber 32 in a high-temperature glass-forming environment, a metal-to-metal seal is formed at the interface 39 between the casing 26 and the mold 16 and at the interface 41 between the casing 26 and the base plate 28. In one embodiment, the facing parts of the casing 26, mold 16, and base plate 28 at the interfaces 39, 41 are very flat and smooth such that when they are clamped together with screw pressure, the metal-to-metal seals are formed between them. There may be small gaps between the facing parts of the casing 26, mold 16, and base plate 28 at the interfaces 39, 41 due to manufacturing tolerances, but these gaps will be very small, approximately 0.1 μm or less, such that the amount of air leakage from the exterior of the mold assembly 12 to the chamber 32 has a negligible impact on the amount of vacuum pressure that is achieved inside the chamber 32. In other embodiments, the metal-to-metal seals formed at the interfaces 39 and 41 include metal gaskets mounted between the facing parts of the casing 26, mold 16, and base plate 28.

A cooling plate 38 is arranged inside the chamber 32, between the bottom surface 34 of the mold 16 and the top surface 37 of the base plate 28. In one embodiment, the cooling plate 38 is spaced from the bottom surface 34 of the mold 16 such that cooling of the mold 16 occurs primarily by radiation. The cooling plate 38 may be as described in the Bailey et al. publication or may be a different type of cooling plate. Standoff tubes 40, 42, 44 are attached between the base plate 28 and cooling plate 38. The standoff tubes 40, 42, 44 support the cooling plate 38 above the base plate 28 and also function as conduits for supplying fluid to and discharging fluid from the cooling plate 38. Typically, the fluid supplied to and discharged from the cooling plate 38 is gas. In illustrated FIG. 1, the standoff tubes 40, 42 function as supply conduits, and the standoff tube 44 functions as a discharge conduit.

The cooling plate 38 has openings 46, 48, 50 at locations corresponding to the standoff tubes 40, 42, 44, respectively, for receiving and discharging fluid. To allow leakproof exchange of fluid with the cooling plate 38 via the openings 46, 48, 50, metal-sealed joints 40a, 42a, 44a are formed between the standoff tubes 40, 42, 44, respectively, and the cooling plate 38 at the openings 46, 48, 50, respectively. In one embodiment, the metal-sealed joints 40a, 42a, 44a are permanently sealed joints formed by a metal-joining process such as brazing, welding, or soldering.

The base plate 28 also has openings 52, 54, 56 at locations corresponding to the standoff tubes 40, 42, 44, respectively. To achieve a leakproof chamber 32 in a high-temperature glass-forming environment, metal-sealed joints 40b, 42b, and 44b are formed between the standoff tubes 40, 42, 44, respectively, and the base plate 28 at the openings 52, 54, 56, respectively. In one embodiment, the metal-sealed joints 40b, 42b, and 44b are permanently sealed joints formed by a metal-joining process such as brazing, welding, or soldering.

The mold assembly 12 includes a concentric tube subassembly 58 for supplying process fluid or vacuum to the chamber 32 and for supplying process fluid to the cooling plate 38. The concentric tube subassembly 58 includes an outer tube 60 and an inner tube 62 in concentric arrangement. The outer diameter of the inner tube 62 is smaller than inner diameter of the outer tube 60, resulting in a fluid passage 64 between the outer tube 60 and the inner tube 62. The upper ends of the outer tube 60 and inner tube 62 are received in a central opening 66 in the base plate 28. A metal-sealed joint 68 is formed between the upper end of the outer tube 60 and the base plate 28 at the opening 66. In one embodiment, the metal-sealed joint 68 is a permanently sealed joint formed by a metal-joining process such as brazing, welding, or soldering.

A metal-sealed joint 70 is formed between the upper ends of the outer tube 60 and 62 to connect the outer tube 60 to the inner tube 62 and to prevent leakage from the fluid passage 64 into the chamber 32. In one embodiment, the metal-sealed joint 70 is a permanently sealed joint formed by a metal-joining process such as brazing, welding, or soldering. In one example of a metal-sealed joint 70, a metal seal ring is placed between the upper ends of the outer tube 60 and inner tube 62. The metal seal ring is then joined to the upper ends of the outer tube 60 and inner tube 62 by a metal-joining process such as brazing, welding, or soldering. A metal-sealed joint 72 is also formed between the lower ends of the outer tube 60 and inner tube 62 to connect the outer tube 60 to the inner tube 62 and to prevent leakage into the fluid passage 64, e.g., when the lower ends of the outer tube 60 and inner tube 62 are inserted into a receiver as will be further described below. The metal-sealed joint 72 may have any of the characteristics described above for the metal-sealed joint 70.

In illustrated FIG. 1, fluid from the discharge standoff tube 44 will be discharged to the atmosphere, e.g., through an opening 82 in the base plate 28. The supply standoff tubes 40, 42 will receive supply of process fluid (or cooling fluid) from the fluid passage 64. To achieve this, the outer tube 60 has side ports 74, 76 that are connected to the fluid passage 64. Supply tubes 78, 80 extend from the side ports 74, 76, respectively, to the openings 52, 54, respectively, in the base plate 28. At the openings 52, 54, the supply tubes 78, 80 align with, and are in communication with, the supply standoff tubes 40, 42. Thus one fluid supply conduit extends from the fluid passage 64, through the port 74, supply tube 78, opening 52, and supply standoff tube 40, to the opening 46 of the cooling plate 38. Similarly, another fluid supply conduit extends from the fluid passage 64, through the port 76, supply tube 80, opening 54, and supply standoff tube 42, to the opening 48 of the cooling plate 38.

For leakproof supply of fluid to the cooling plate 38 from the fluid passage 64, metal-sealed joints 78a, 80a are formed at the interfaces between the supply tubes 78, 80 and the base plate 28 (i.e., at the openings 52, 54). Metal-sealed joints 78b, 80b are also formed at the interfaces between the supply tubes 78, 80 and the outer tube 60 (i.e., at the side ports 74, 76). The metal-sealed joints 78a, 80a, 78b, 80b may be permanently sealed joints formed by a metal-joining process such as brazing, welding, or soldering.

The upper opening 62a of the inner tube 62 is in communication with the chamber 32 by virtue of being open to the chamber 32. This allows process fluid or vacuum to be supplied into the chamber 32 from the lower opening 62b of the inner tube 62 that is located a distance from the plenum base 24. The openings (21 in FIG. 2) in the mold 16 are open to, or in communication with, the chamber 32, allowing process fluid or vacuum supplied into the chamber 32 via the inner tube 62 to be communicated to the mold cavity (18 in FIG. 2). During conforming of a 2D glass sheet to the 3D mold surface (20 in FIG. 2), vacuum can be supplied to the mold cavity to pull the glass sheet against the 3D mold surface, and thereby form a 3D glass article. After the 3D glass article has been formed, process fluid (or cooling fluid) can be supplied to the mold cavity to assist in reducing the temperature of the 3D glass article below the strain point of the glass.

At a lower section 61 of the concentric tube subassembly 58, the outer tube 60 has an outer profiled surface 84 providing axially spaced-apart grooves 86, 88 for retaining seals 90, 92, such as O-ring seals. In between the grooves 86, 88 is a recessed surface 94. The outer tube 60 has at least one opening 96 in its wall that connects the recessed surface 94 to the fluid passage 64, which is in communication with the cooling plate 38 via the tubes 78, 40, 80, 42. The lower opening 62b of the inlet tube 62 is also located at the lower section 61 of the concentric tube assembly 58.

Figure 3:
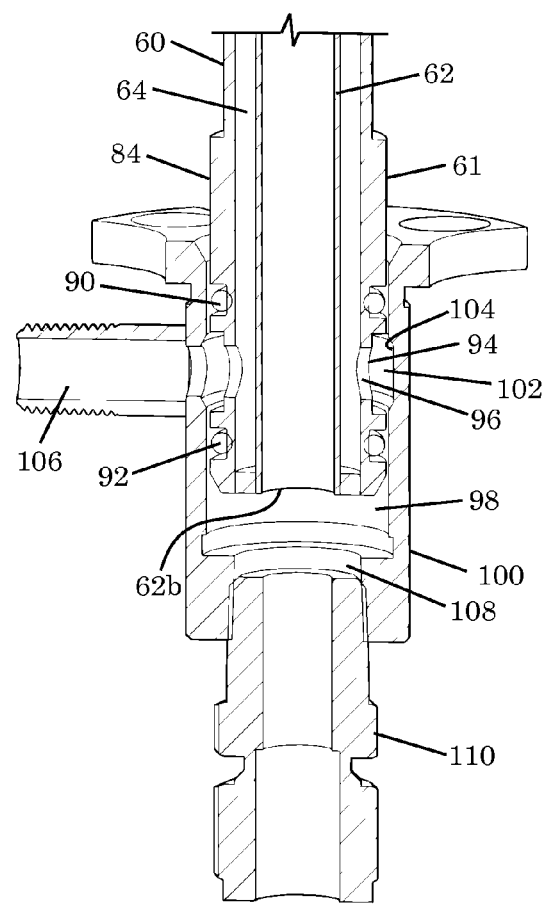
FIG. 3 shows a lower end of a concentric tube assembly inserted in a receiver.

FIG. 3 shows the lower section 61 of the concentric tube subassembly 58 inserted into a bore 98 of a receiver 100 such that the opening 96 in the outer tube 60 and the lower opening 62b of the inner tube 62 are located within the receiver 100. In this position, the seals 90, 92 engage the wall 104 of the bore 98. A fluid space 102 is formed between the wall 104 of the bore 98 and the recessed surface 94 of the outer tube 60. Fluid is prevented from leaking out of the fluid space 102 to the outside of the receiver 100 by the seals 90, 92 that engage the bore wall 104 adjacent to ends of the fluid space 102. The receiver 100 has a side port 106 that is in communication with the fluid space 102. Through the side port 106, fluid space 102, and opening 96, fluid can be communicated to the fluid passage 64. The receiver 100 has a bottom port 108 that is in communication with the lower opening 62b of the inner tube 62. Through the bottom port 108, fluid or vacuum can be supplied to the inner tube 62. A supply end 110 of a cooling fluid or vacuum source is shown at the bottom port 108 for illustration purposes.

The receiver 100 can be considered to be a removable part of the mold assembly 12 or as a separate part to be used with the mold assembly 12.

Figure 4:
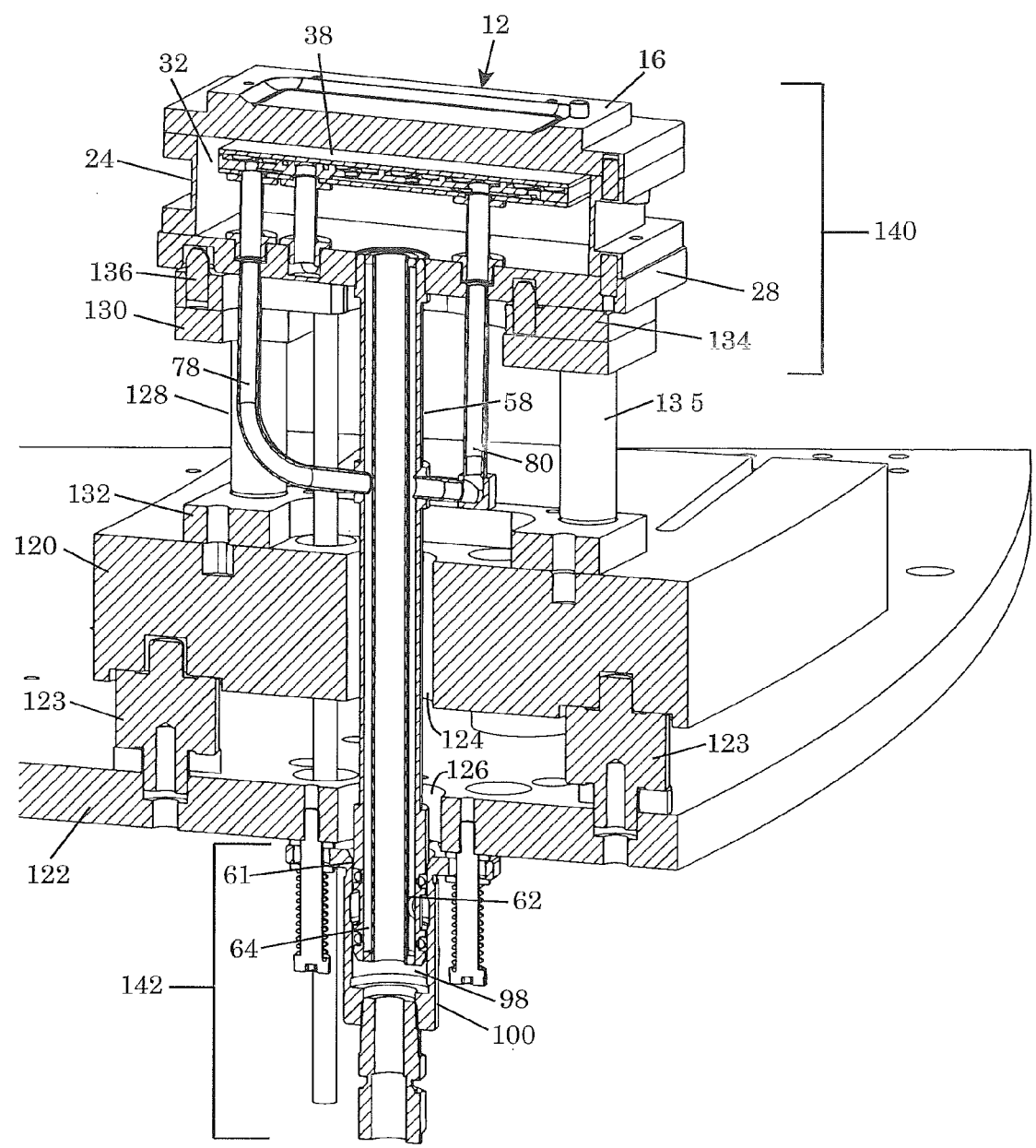
FIG. 4 shows a mold assembly installed at a glass forming station.

FIG. 4 shows the mold assembly 12 installed at a station of a glass molding system. In FIG. 4, a primary base 120 is supported above an indexing table 122 by primary base standoffs 123. The primary base 120 has an opening 124 that is aligned with an opening 126 in the indexing table 122. The receiver 100 is attached to the bottom of the indexing table 122 such that the bore 98 of the receiver 100 is aligned with the opening 126 in the indexing table 122. The lower end of the concentric tube subassembly 58 is inserted into the bore 98 of the receiver 100 through the aligned holes 124, 126. On top of the primary base 120 is a support structure 128. The plenum base 24 is placed on the support structure 128. In illustrated FIG. 4, the support structure 128 includes mounting blocks 130, 132 and standoff tubes 135 extending between the mounting blocks 130, 132. The mounting block 132 is secured to the primary base 120.

Figure 5:
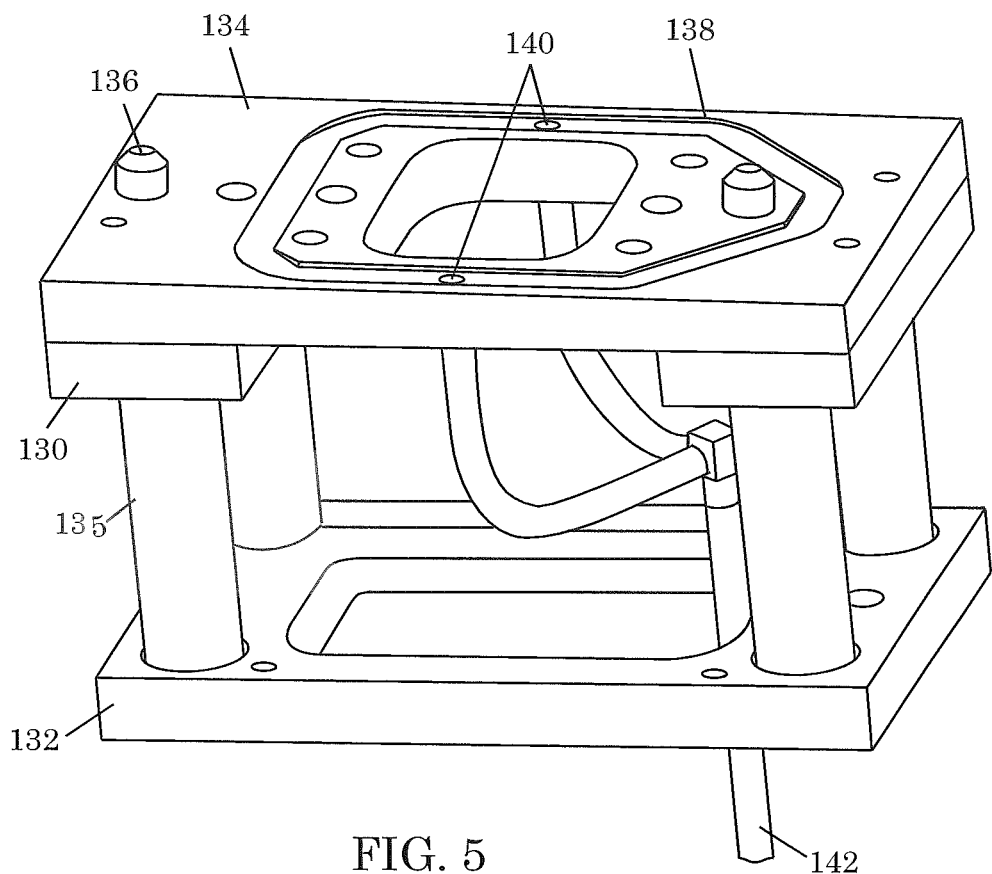
FIG. 5 shows an adapter plate with vacuum clamping capability.

An adapter plate 134 is mounted on the mounting block 130, e.g., using screws and the like. The base plate 28 of the plenum base 24 sits on the adapter plate 134. Means such as pins 136 may be used to align the base plate 28 on the adapter plate 134. The pins 136 may be provided on the adapter plate 134 and may be received by corresponding holes at the bottom of the base plate 28. Further, the base plate 28 may be secured to the adapter plate 134 by vacuum. FIG. 5 shows an embodiment of the adapter plate 134 that enables vacuum clamping of the base plate (28 in FIG. 4). The adapter plate 134 in FIG. 5 has a vacuum groove 138 and vacuum holes 140. Vacuum can be supplied to the vacuum holes 140 and then the vacuum groove 138 through a vacuum hold-down tube 142. Vacuum in the vacuum groove 138 will clamp the base plate (28 in FIG. 4) to the adapter plate 134. Other means such as bolts and clamps may alternately be used to clamp the adapter plate 134 to the base plate 28. However, vacuum clamping will make it easier for automatic changeout of the mold assembly 12 since all that would be needed to separate the plenum base 24 from the adapter plate 134 would be release of the hold-down vacuum.

Returning to FIG. 4, the mold 16 and plenum base 24 are located in a high temperature zone 140 of the glass forming station. The receiver 100 is located in a low temperature zone 142 of the glass forming station. The concentric tube assembly 58 is coupled to the plenum base 24 and extends from the plenum base 24 into the receiver 100. The receiver 100 serves as a common interface for communicating with the inner tube 62 and the fluid passage 64. The mold assembly 12 can be quickly uninstalled from the glass forming station for operations such as resurfacing of the mold 16. To uninstall the mold assembly, the base plate 28 of the plenum base 24 is separated from the adapter plate 134. Then, the lower end 61 of the concentric tube assembly 58 is removed from the receiver 100. The receiver 100 can be left in place at the bottom of the indexing table 122 or removed. Preferably, the receiver 100 is left in place at the bottom of the indexing table 122. If the receiver 100 is left in place, another mold assembly can be installed at the glass forming station while the mold assembly that was removed is being serviced.

At the glass forming station, since the receiver 100 is located in a low temperature zone 142, sealing between the receiver 100 and the lower end 61 of the concentric tube assembly 58 can be achieved reliably for an extended period with non-permanent seals, such O-ring seals (90, 92 in FIG. 3). The non-permanent seals will allow quick retrieval of the lower end 61 of the concentric tube assembly 58 from the receiver 100.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

The invention claimed is:

1. A mold assembly, comprising:
   a mold having a mold cavity defined by a mold surface having a three-dimensional shape and at least one opening for communication of fluid or vacuum to the mold cavity;
   a plenum base mounted to the mold such that a chamber is defined between the plenum base and the mold, the chamber being in communication with the at least one opening in the mold;
   a cooling plate arranged in the chamber;
   an outer tube and an inner tube each having a first end proximate the plenum base and a second end remote from the plenum base, the outer tube and inner tube being concentrically arranged such that a fluid passage is defined between the outer tube and inner tube, wherein the inner tube comprises an inner wall and an outer wall;
   a first fluid conduit defined by the inner wall of the inner tube extending from a fluid supply or vacuum source through the inner tube to a first opening in the plenum base into the chamber; and a second fluid conduit extending from the fluid passage through a port in the outer tube and a second opening in the plenum base to the cooling plate.

2. The mold assembly of claim 1, wherein a metal-sealed joint is formed between an end of the outer tube and the plenum base proximate the first opening in the plenum base.

3. The mold assembly of claim 1, wherein the fluid passage is sealed at distal ends by a first metal-sealed joint formed between the first ends of the outer and inner tubes and a second metal-sealed joint formed between the second ends of the outer and inner tubes.

4. The mold assembly of claim 1, wherein the outer tube comprises an outer profiled surface providing a first groove and a second groove in axially spaced-apart relation.

5. The mold assembly of claim 4, further comprising a first seal member retained in the first groove and a second seal member retained in the second groove.

6. The mold assembly of claim 5, wherein the first and second seal members are O-ring seals.

7. The mold assembly of claim 5, wherein the outer profiled surface further provides a recessed surface between the first and second grooves.

8. The mold assembly of claim 7, wherein the first and second grooves and recessed surface are located proximate to the second end of the outer tube.

9. The mold assembly of claim 7, wherein the second fluid conduit comprises a first tube extending from the port in the outer tube to the second opening in the plenum base.

10. The mold assembly of claim 9, wherein the second fluid conduit further comprises a first metal-sealed joint formed between the first tube and the plenum base at the second opening and a second metal-sealed joint formed between the first tube and the outer tube at the port in the outer tube.

11. The mold assembly of claim 10, wherein the second fluid conduit further comprises a second tube extending from the second opening in the plenum base to an opening in the cooling plate.

12. The mold assembly of claim 11, further comprising a third metal-sealed joint formed between the second tube and the plenum base at the second opening and a fourth metal-sealed joint formed between the second tube and the cooling plate at the opening in the cooling plate.

13. The mold assembly of claim 1, further comprising a third fluid conduit extending from the fluid passage through another port in the outer tube and a third opening in the plenum base to the cooling plate.

14. The mold assembly of claim 1, further comprising a receiver having a bore, a first port for communication of fluid with the bore, and a second port for communication of fluid with the bore, wherein the second ends of the outer tube and inner tube are received in the bore, and further comprising a first fluid path between the first port and the fluid passage and a second fluid path between the second port and the inner tube.

15. The mold assembly of claim 14, wherein the first fluid path comprises an opening in the outer tube that is connected to the fluid passage and a fluid space formed between the outer tube and the receiver proximate the opening in the outer tube.

16. The mold assembly of claim 15, wherein an outer tube sealing engages the receiver adjacent to distal ends of the fluid space.

17. The mold assembly of claim 1, wherein an interface between the second fluid conduit and each of the outer tube, plenum base, and cooling plate comprises a metal-sealed joint.

18. The mold assembly of claim 1, wherein the outer tube is coupled to the plenum base, and wherein an interface between the outer tube and the plenum base comprises a metal-sealed joint.

19. The mold assembly of claim 18, wherein the first ends of the inner and outer tubes are connected by a metal-sealed joint and the second ends of the inner and outer tubes are connected by a metal-sealed joint.

* * * * *